US008322366B2

(12) United States Patent
Sullivan

(10) Patent No.: US 8,322,366 B2
(45) Date of Patent: Dec. 4, 2012

(54) VALVE ALARM

(76) Inventor: Joseph Sullivan, Gilbert, AZ (US)

(*) Notice: Subject to any disclaimer, the term of this patent is extended or adjusted under 35 U.S.C. 154(b) by 734 days.

(21) Appl. No.: 12/435,798

(22) Filed: May 5, 2009

(65) Prior Publication Data

US 2009/0273482 A1 Nov. 5, 2009

Related U.S. Application Data

(60) Provisional application No. 61/050,326, filed on May 5, 2008.

(51) Int. Cl.
*F16K 37/00* (2006.01)
(52) U.S. Cl. .................................................. 137/552.7
(58) Field of Classification Search ................ 137/552.7
See application file for complete search history.

(56) References Cited

U.S. PATENT DOCUMENTS

| 7,028,605 B2 * | 4/2006 | Owen et al. ................. 137/552.7 |
| 7,114,510 B2 * | 10/2006 | Peters et al. ................ 137/552.7 |

* cited by examiner

*Primary Examiner* — Eric Keasel
(74) *Attorney, Agent, or Firm* — Parsons & Goltry; Robert A. Parsons; Michael W. Goltry

(57) ABSTRACT

A valve alarm for use with a valve having an open position, a closed position, and a knob is provided. The valve alarm includes a handle having a knob seat receivable about the knob, and a body defining a volume. The knob seat is carried within the volume and moveable relative the body between an open position and a closed position. A switch is carried by the handle and changed from an Off orientation to an On orientation when the knob seat is moved to the open position, and changed from the On orientation to the Off orientation when the knob seat is moved to the closed position. A timer circuit is coupled to the switch and carried by the handle and includes a time period counted down to zero upon activation by the switch changed to the On orientation. A signaling device is carried by the handle and coupled to the timing circuit for activation upon the timer circuit time period reaching zero.

15 Claims, 3 Drawing Sheets

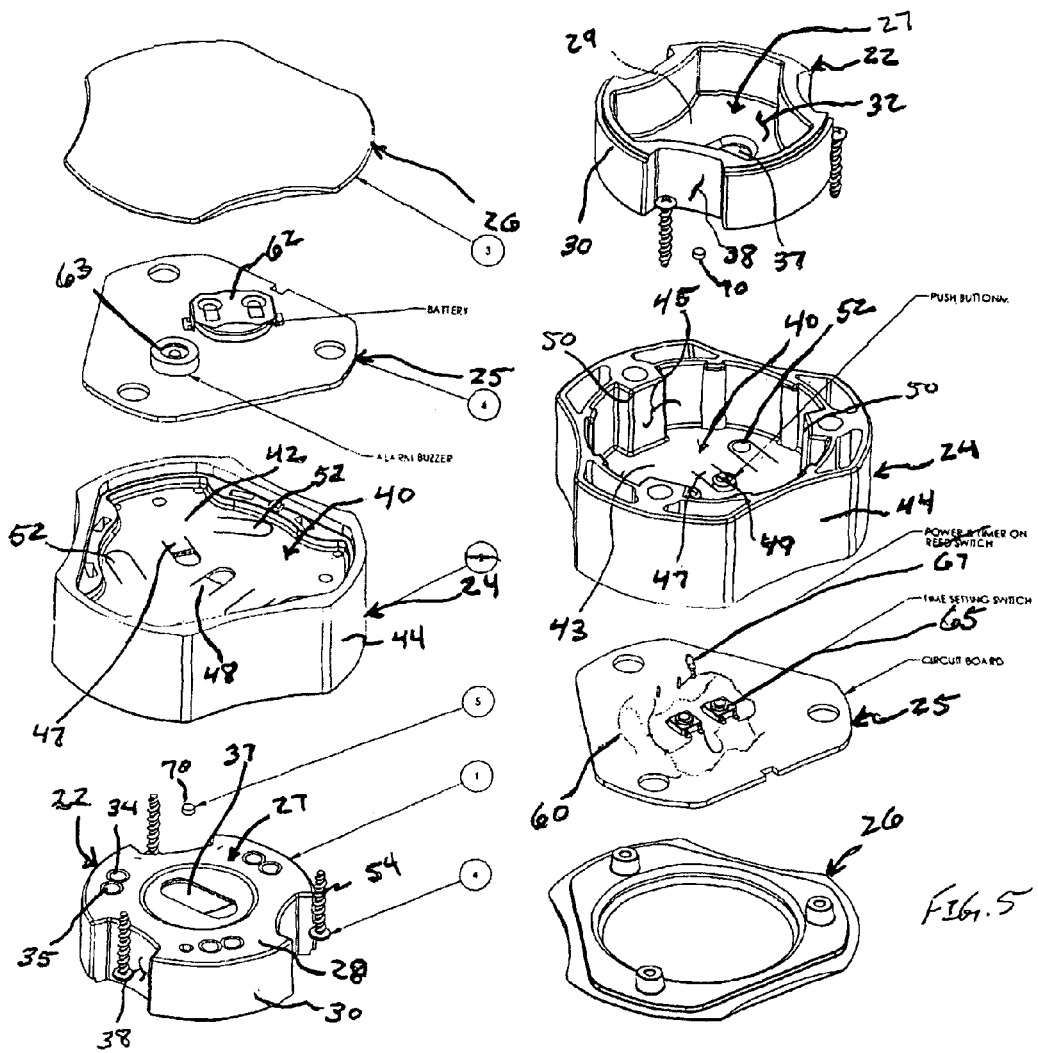
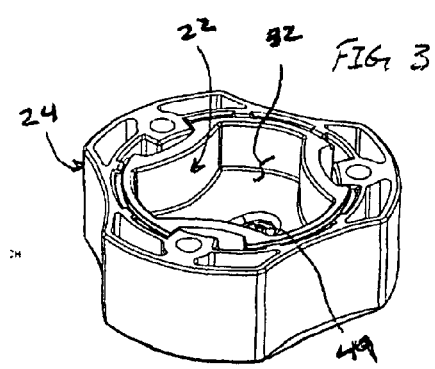
FIG. 4
FIG. 3
FIG. 5

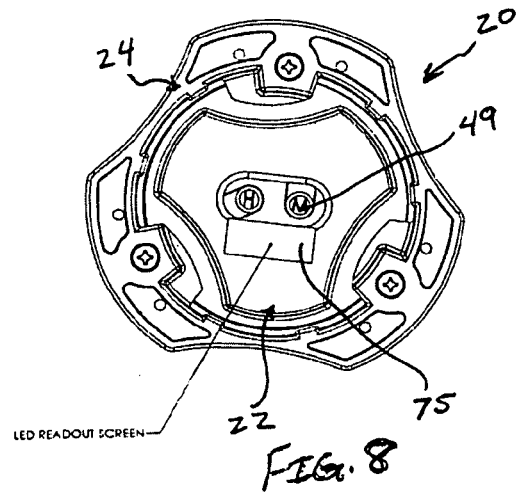
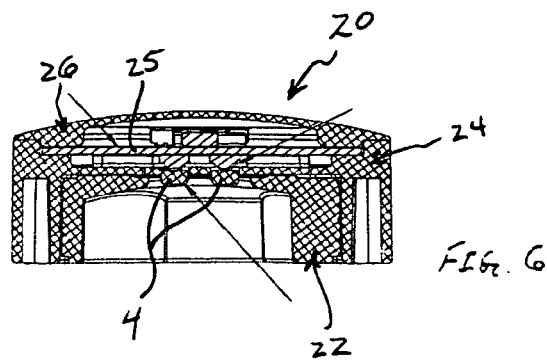
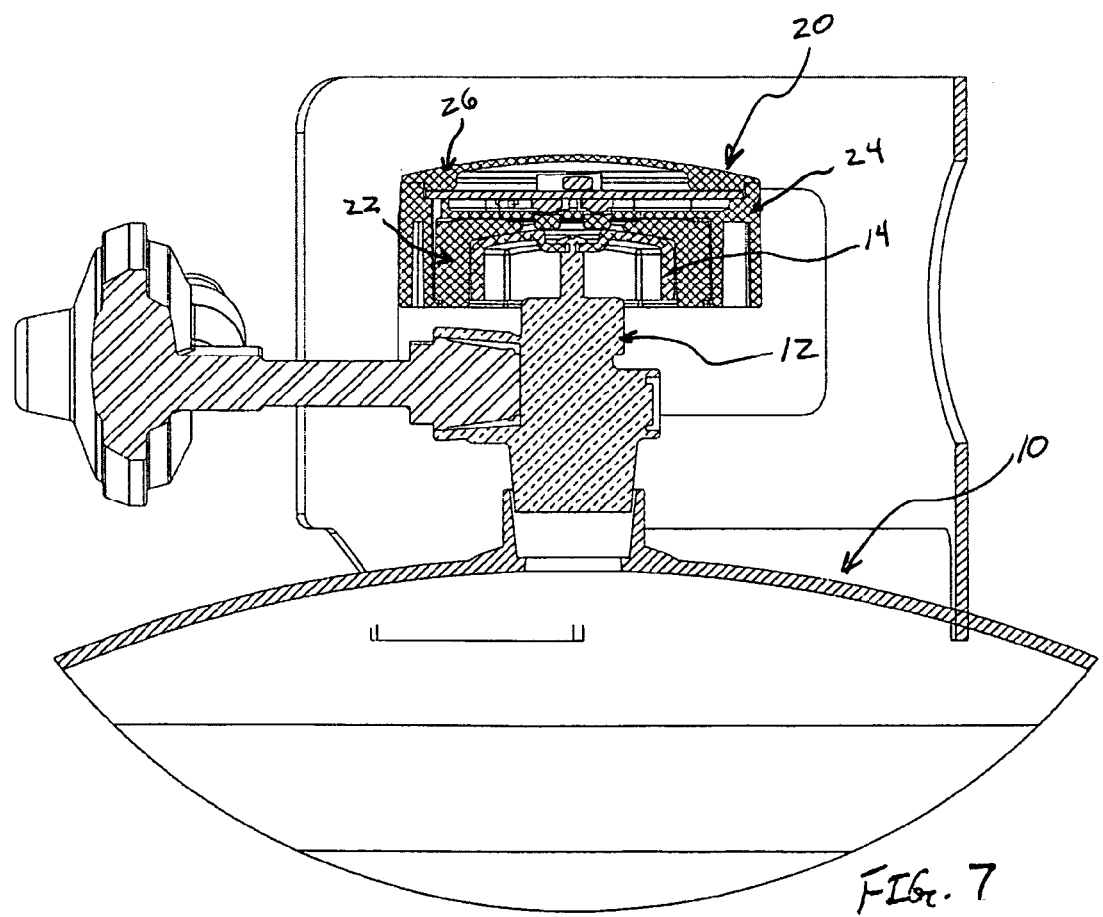

VALVE ALARM

CROSS-REFERENCE TO RELATED APPLICATION

This application claims the benefit of U.S. Provisional Application No. 61/050,326, filed 5 May 2008.

FIELD OF THE INVENTION

This invention relates to indicator devices.

More particularly, the present invention relates to devices which time an event and indicate the termination of the time with a signal.

BACKGROUND OF THE INVENTION

In the field of indicator devices, timing an event and indicating an end to the time period is well known. Alarm clocks, egg timers and the like can be set to provide an audible signal at the end of a designated time period. While effective and simple, these devices must be present and an individual must remember to initiate the device for a period of time.

When a fluid is delivered for an application, such as water to a pool or landscaping, propane to a stove or barbecue grill, etc. a reservoir is typical provided and controlled through a valve. The valve is opened to provide fluid flow, and closed to stop fluid flow. This is an old and heavily used mechanism. The simplicity of a valve makes it a very efficient and inexpensive device. The problem is in the common everyday use of a valve, such as by turning a handle or knob. It is so common that it is often overlooked. A gas grill is turned on by turning the valve of a propane tank. This is very effective; however, the valve is often left on, forgotten in the confusion of the grilling activities. This can be dangerous and is wasteful. When using a hose coupled to a water valve to fill a pool, water the landscaping or the like, the valve is turned on and often forgotten. The result is a flooded yard and large water bill. Many fluids delivered through a valve are wasted due to simply forgetting to turn off a valve.

Sometimes timing devices such as egg timers and the like are used to remind one that a valve is on. While somewhat effective, an individual must have a timer present, and remember to turn it on when turning on the valve. Many times, the timer is not present, or an individual forgets to employ one until it is too late.

It would be highly advantageous, therefore, to remedy the foregoing and other deficiencies inherent in the prior art.

SUMMARY OF THE INVENTION

Briefly, to achieve the desired objects and advantages of the instant invention, provided is a valve alarm for use with a valve having an open position, a closed position, and a knob for moving the valve between the open position and the closed position. The valve alarm includes a handle receivable about the knob. A switch is carried by the handle and is changeable between an On orientation and an Off orientation. The switch is changed to the On orientation upon turning the knob of the valve toward the open position and changed to the Off orientation upon turning the knob of the valve toward the closed position. A timer circuit is coupled to the switch and carried by the handle. The timer circuit includes a time period counted down to zero upon activation by the switch changed to the On orientation. A signaling device is carried by the handle and coupled to the timing circuit for activation upon the timer circuit time period reaching zero. A power source is coupled to the timer circuit, switch and signaling device to provide power to the timer circuit with the switch in the On orientation.

In another aspect of the present invention, a valve alarm for use with a valve having an open position, a closed position, and a knob for moving the valve between the open position and the closed position is provided. The valve alarm includes a handle having a knob seat receivable about the knob, and a body defining a volume. The knob seat is carried within the volume and moveable relative the body between an open position and a closed position. A switch is carried by the handle and changeable between an On orientation and an Off orientation. The switch is changed from the Off orientation to the On orientation when the knob seat is moved to the open position, and changed from the On orientation to the Off orientation when the knob seat is moved to the closed position. A timer circuit is coupled to the switch and carried by the handle, the timer circuit has a time period counted down to zero upon activation by the switch changed to the On orientation. A signaling device is carried by the handle and coupled to the timing circuit for activation upon the timer circuit time period reaching zero. A power source is coupled to the timer circuit, switch and signaling device, and powers the timer circuit with the switch in the On orientation.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which:

FIG. 3 is a bottom perspective view of the valve alarm according to the present invention;

FIG. 4 is top exploded perspective view of the valve alarm according to the present invention;

FIG. 5 is bottom exploded perspective view of the valve alarm according to the present invention;

FIG. 6 is a sectional view of the valve alarm taken along lines 6-6 of FIG. 1

FIG. 7 is a sectional side view of the valve assembly and valve alarm taken along lines 7-7 of FIG. 2; and FIG. 8 is a bottom plan view of another embodiment of a valve alarm.

DETAILED DESCRIPTION OF THE PREFERRED EMBODIMENTS

Figure 1:
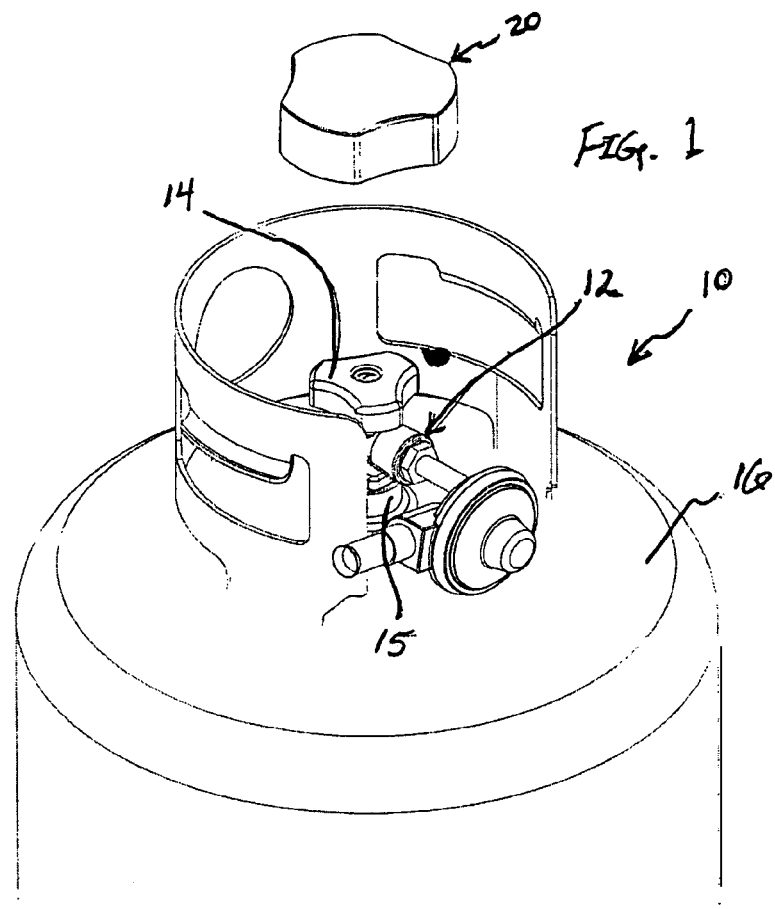
FIG. 1 is a perspective view of a propane tank with valve assembly to which a valve alarm is to be attached.
Figure 2:
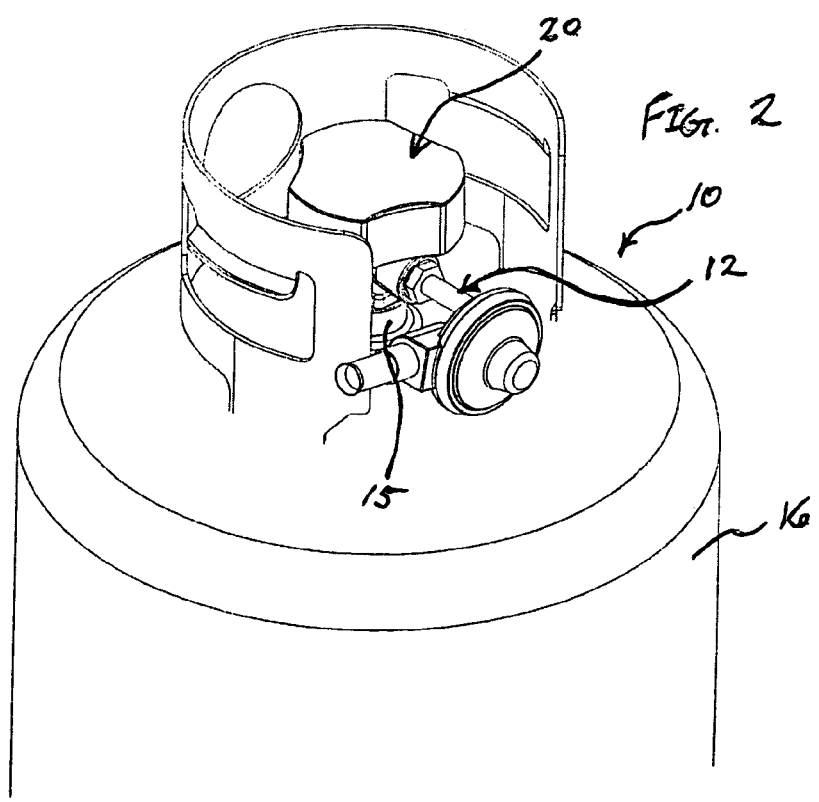
FIG. 2 is a perspective view of a propane tank with valve assembly with the valve alarm attached.

Turning now to the drawings in which like reference characters indicate corresponding elements throughout the several views, attention is first directed to FIG. 1 which illustrate a propane tank generally designated 10. Propane tank 10 is of conventional design and includes a valve assembly 12 having a knob 14 coupled to a valve 15. Valve assembly 12 is coupled to a storage tank 16. Knob 14 is turned in a first direction (typically clockwise) to open valve 15 (open position) and allow propane to flow through valve 15 to a desired application. Knob 14 is turned in an opposing, second direction, (typically counter clockwise) to close valve 14 (closed position) and stop the flow of propane from tank 16. A valve alarm generally designate 20 is shown prior to engagement with knob 14. With additional reference to FIG. 2, valve alarm 20 is shown received by knob 14. Valve alarm 20, when received by knob 14, is turned, and thereby knob 14 is turned in a convention manner. The operation of valve alarm 20 as it is turned will be described presently.

It will be understood that while a propane tank is illustrated and described in connection with the present invention, other valve operated systems or devices can benefit from the present invention as will be described presently. Thus, the present invention can be used on any valve which supplies a resource such as a fuel like, propane, butane, acetylene, white gas and the like, other gaseous resources such as oxygen, nitrogen and the like, or fluid resources such as water. In each of these cases, the valve is turned on to supply a resource to some application. For example, propane is supplied to a gas grill, acetylene to a torch, water to a watering system. Often, the valve supplying the resource is unintentionally left on potentially causing a safety hazard, wasting resources and, for example in the case of water, flooding the area. Wasting resources is not only ecologically unsound, it can be expensive. Thus, in each of these instances, valve alarm 20 of the present invention can reduce waste and expense while increasing safety.

Referring to FIGS. 3, 4, 5, 6 and 7, valve alarm 20 is illustrated. In the preferred embodiment, valve alarm 20 includes a handle 21 including a knob seat 22 and a body 24. Valve alarm 20 further includes a controller board 25 and a cover 26. Knob seat 22 includes a base 27 having a top surface 28, a bottom surface 29 and sidewalls 30 depending substantially perpendicularly from a periphery thereof. Bottom surface 29 and sidewalls 30 define a volume 32 configured to be received about knob 14 of valve assembly 12. In this preferred embodiment the shape of volume 32 is such as to closely receive knob 14 therein. It is contemplated that the volume can be initially formed of varying shapes to accommodate differing knobs or handles. Volume 32 can also be formed with a generic shape and include a pliable material which is shaped when pressed over a knob. The pliable material is then set or allowed to harden to transform volume 32 into a shape which will then conform to a specific knob or handle. It should also be understood that a shape of volume 32 can be provided which would accommodate and function with multiple knobs. The purpose of volume 32 is to receive a knob of a valve assembly so that the knob is turned to the open position and the closed position when knob seat 22 is correspondingly turned. Knob seat 22 further includes pairs of indents 34 and 35 formed on top surface 28, an aperture 37 formed centrally through base 27, for purposes which will be described presently. Knob seat 22, in this specific embodiment, includes guide channels 38 formed in base 27 and sidewalls 30 at the periphery of knob seat 22.

Body 24 includes a base 40 having a top surface 42, a bottom surface 43 and sidewalls 44 depending substantially perpendicularly from a periphery thereof. Bottom surface 43 and sidewalls 44 define a volume 45 configured to received knob seat 22. Flexible fingers 47 and 48 are formed generally centrally in base 40 with buttons 49 formed thereon. Buttons 49 of flexible fingers extend through aperture 37 of knob seat 22 when knob seat 22 is positioned in body 24, as can be seen in FIGS. 3 and 6. Stops 50 are formed on sidewalls 44 and extend into volume 45. Stops 50, in this embodiment are generally molded with sidewalls 44 and extend generally from top to bottom. When positioned over knob seat 22, stops 50 are positioned within guide channels 38. Body 24 will turn a few degrees (the preferred amount is 15 degrees, but is not intended to be limited thereto) in a clockwise and counter clockwise direction with respect to knob seat 22, as knob 14 is turned to the open position and the closed position. When valve alarm 20 is turned in a clockwise direction, to turn knob 14 in a clockwise direction and open valve assembly 12, the resistance in opening the valve first results in body 24 turning clockwise a few degrees (15 degrees in this embodiment) relative knob seat 22. Stops 50 then contact an edge of guide channels 38 preventing further relative movement between knob seat 22 and body 24. At this point, continued turning of valve alarm 20 results in turning knob 14 clockwise and valve assembly 22 to the open position. Conversely, turning valve alarm 20 in the counterclockwise direction has little resistance, and knob seat 22 and body 24 will not move relative each other, but will turn counterclockwise together along with knob 14. When valve assembly 12 reaches the closed position, knob 14 will stop turning and stop knob seat 22 from turning. Body 24 will continue the few degrees until stops 50 contact an opposing edge of guide channels 38, preventing further rotation.

To insure that knob seat 22 and body 24 turn together in the counter clockwise direction until valve assembly reaches the closed position, a flexible finger detent 52 is formed in base 40 of body 24. In the valve open position, finger detent 52 is received in indent 34 of knob seat 22. This prevents separate turning of knob seat 22 and body 24 until the valve moved to the closed position and the resistance of the closed valve allows the detent/indent interaction to be overcome. When the valve is closed and body 24 moves the few degrees relative knob seat 22, finger detent 52 is received in indent 35. One or more detent and indent elements can be used, and in the present embodiment three pairs are employed. Thus, when opening and closing a valve, knob seat 22 and body 24 turn a few degrees relative each other at the start of opening the valve and at the end of closing the valve.

In this embodiment, controller board 25 is carried on the top surface 42 of base 40 and sealed from the weather or other detrimental factors by a cover 26. Cover 26 can be attached to body 24 in many different ways such as adhesives, clips welding depending on the materials used, snap fit or, as in this embodiment the use of fasteners such as screws 54. Screws 54 also extend through apertures formed in controller board 25 and secure it in position. Controller board 25 carries well known timer circuits 60 (not accurately portrayed), a battery and battery receptacle 62, an alarm buzzer 63, time setting switch/switches 65 and a power and timer on reed switch 67. It will be understood that the timer circuitry can have a fixed time period such that no time setting switches are required, or, as in the present embodiment, two switches are employed allowing the timer to be set in minute and hour increments. Other time increments can be used if desired. When properly assembled, buttons 49 extend through aperture 37. A contact surface on the side of flexible fingers 47 and 48 opposite buttons 49 (top surface 42), reside against switches 65. To set a desired time period in the timing circuit, buttons 49 are pressed prior to installing valve alarm 20 on knob 14. Pressing buttons 49 deflects flexible fingers 47 and 48 against and triggers switches 65.

Additionally, while alarm buzzer 63 is the preferred signal, other or multiple signals, audible or visual can be employed, such as lights, bells, beepers, or vibrators such as found in cell phones, can be employed. Currently, a remote RF clip could be worn by an individual and receive a signal from the signal device in indicating the valve is on. Also, while a battery is employed as a power source in the present invention, other power sources such as solar power and the like can be employed.

Power and timer on reed switch 67 operates to begin the timing sequence which terminates in a signal, absent turning off the timing device. A magnet 70 is carried by knob seat 22. In the closed position of knob seat 22 relative body 24, magnet 70 is positioned on knob seat 22 sufficiently distant from reed switch 67 so as to maintain reed switch 67 in an open configuration (Off orientation) and the timer circuit off. When a valve is opened by turning valve alarm 20, knob seat 22 is moved to the open position relative body 24. Magnet 70 is positioned on knob seat 22 is correspondingly moved to a position sufficiently close to reed switch 67 so as to maintain reed switch 67 in a closed configuration (On orientation) and the timer circuit on. Once the time period of the timer runs down to zero a signal is given to notify that the valve is open and should be closed. If the signal is activated, turning off the valve stops the signal.

While a reed switch is employed in the present invention, it is contemplated that the valve alarm can be turned on with a flow switch carried in the flow path of the fluid being delivered. Thus when a knob is turned to initiate flow of the fluid, the timer circuit is initiated and a signal will be displayed at the exhaustion of the timer unless the fluid flow is stopped by turning off the valve. If the signal is activated, turning off the valve stops the signal.

Turning now to FIG. 8, timer circuit 60 includes a display 75 for displaying the timer period. This display can be any display with low power consumption such as an led or as in this preferred embodiment, a LCD display.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A valve alarm for use with a valve having an open position, a closed position, and a knob for moving the valve between the open position and the closed position, the valve alarm comprising:
   a handle receivable about the knob, wherein the handle includes a knob seat receivable about and movable with the knob, the knob seat carried within a body, the knob seat moveable relative the body between an open position and a closed position;
   a switch carried by the handle and changeable between an On orientation and an Off orientation, the switch changed to the On orientation upon turning the knob of the valve toward the open position and the knob seat is moved to the open position, the switch changed to the Off orientation upon turning the knob of the valve toward the closed position and the knob seat is moved to the closed position;
   a timer circuit coupled to the switch and carried by the handle, the timer circuit having a time period counting down to zero upon activation by the switch changed to the On orientation;
   a signaling device carried by the handle and coupled to the timing circuit for activation upon the timer circuit time period reaching zero; and
   a power source coupled to the timer circuit, switch and signaling device, and powering the timer circuit with the switch in the On orientation.

2. A valve alarm as claimed in claim 1 wherein the switch is a reed switch carried by the body, and the switch is changed between the On orientation and the Off orientation by a magnet carried by the knob seat.

3. A valve alarm as claimed in claim 1 wherein the timer circuit includes a time setting switch for adjusting the time period of the timer circuit.

4. A valve alarm as claimed in claim 3 wherein the timer circuit includes a display for displaying the timer period.

5. A valve alarm as claimed in claim 1 wherein the power source is a battery.

6. A valve alarm for use with a valve having an open position, a closed position, and a knob for moving the valve between the open position and the closed position, the valve alarm comprising:
   a handle including:
      a knob seat receivable about the knob;
      a body defining a volume, the knob seat carried within the volume and moveable relative the body between an open position and a closed position;
   a switch carried by the handle and changeable between an On orientation and an Off orientation, the switch is changed from the Off orientation to the On orientation when the knob seat is moved to the open position, and changed from the On orientation to the Off orientation when the knob seat is moved to the closed position;
   a timer circuit coupled to the switch and carried by the handle, the timer circuit having a time period counting down to zero upon activation by the switch changed to the On orientation;
   a signaling device carried by the handle and coupled to the timing circuit for activation upon the timer circuit time period reaching zero; and
   a power source coupled to the timer circuit, switch and signaling device, and powering the timer circuit with the switch in the On orientation.

7. A valve alarm as claimed in claim 6 wherein the switch is a reed switch carried by the body, and the switch is changed between the On orientation and the Off orientation by a magnet carried by the knob seat.

8. A valve alarm as claimed in claim 6 wherein the timer circuit includes a time setting switch for adjusting the time period of the timer circuit.

9. A valve alarm as claimed in claim 8 wherein the timer circuit includes a display for displaying the timer period.

10. A valve alarm as claimed in claim 6 wherein the power source is a battery.

11. A valve alarm comprising:
   a valve having an open position, a closed position, and a knob for moving the valve between the open position and the closed position;
   a handle received about the knob for moving the knob and thereby the valve between the open position and the closed position, wherein the handle includes a knob seat received about and movable with the knob, the knob seat carried within a body, the knob seat moveable relative the body between an open position and a closed position;
   a switch carried by the handle and changeable between an On orientation and an Off orientation, the switch changed to the On orientation upon turning the knob of the valve toward the open position with the handle and the knob seat is moved to the open position, the switch changed to the Off orientation upon turning the knob of the valve to the closed position with the handle and the knob seat is moved to the closed position;
   a timer circuit coupled to the switch and carried by the handle, the timer circuit having a time period counting down to zero upon activation by the switch changed to the On orientation;

a signaling device carried by the handle and coupled to the timing circuit for activation upon the timer circuit time period reaching zero; and a power source coupled to the timer circuit, switch and signaling device, and powering the timer circuit with the switch in the On orientation.

12. A valve alarm as claimed in claim 11 wherein the switch is a reed switch carried by the body, and the switch is changed between the On orientation and the Off orientation by a magnet carried by the knob seat.

13. A valve alarm as claimed in claim 11 wherein the timer circuit includes a time setting switch for adjusting the time period of the timer circuit.

14. A valve alarm as claimed in claim 13 wherein the timer circuit includes a display for displaying the timer period.

15. A valve alarm as claimed in claim 11 wherein the power source is a battery.

* * * * *